US000002038H

(19) United States

(12) Statutory Invention Registration (10) Reg. No.: US H2038 H

Nial et al. (43) Published: Aug. 6, 2002

(54) CARTRIDGE ACTUATED ORDNANCE FILTER

(75) Inventors: John A. Nial, Park Hall; J. David DeLeon, Bel Alton, both of MD (US); Nickolas Kaloterakis, Washington, DC (US); Thomas K. Kang, Burke, VA (US)

(73) Assignee: The United States of America as represented by the Secretary of the Navy, Washington, DC (US)

(21) Appl. No.: 09/783,014

(22) Filed: Feb. 9, 2001

(51) Int. Cl.[7] ..... F42B 3/18

(52) U.S. Cl. ..... 102/202.2

(58) Field of Search ..... 102/202.1–202.4

(56) References Cited

U.S. PATENT DOCUMENTS

| | | | | | |
|---|---|---|---|---|---|
| 2,818,020 | A | * | 12/1957 | Burklund | 102/202.1 |
| 4,061,088 | A | * | 12/1977 | Ueda | 102/202.4 |
| 4,335,654 | A | * | 6/1982 | Bratt | 102/202.2 |
| 4,944,224 | A | * | 7/1990 | Fiedler et al. | 102/202.2 |
| 5,099,762 | A | * | 3/1992 | Drapala | 102/202.2 |
| 5,291,829 | A | * | 3/1994 | Avory et al. | 102/202.2 |
| 5,576,509 | A | * | 11/1996 | Refouvelet et al. | 102/202.7 |
| 5,691,498 | A | * | 11/1997 | Fogle, Jr. | 102/202.2 |

* cited by examiner

*Primary Examiner*—Harold J. Tudor

(74) *Attorney, Agent, or Firm*—Mark Homer

(57) ABSTRACT

The present invention comprises a capacitor, of sufficient area to cover the glass seal of a cartridge actuated ordnance device, comprising a low pass filter. This capacitor connects to the leads of the cartridge actuated ordnance device in a fashion that covers the glass seal of the cartridge. Although the capacitor is not directly contacting the glass seal, it is located proximately so that very few frequencies of EMR can enter the seal, wherein a safe level of EMR is achieved. The capacitor also filters both EMR and ESD that come through the leads of the cartridge.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CARTRIDGE ACTUATED ORDNANCE FILTER

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

Field of the Invention

The present invention pertains to an improvement to cartridge actuated ordnance. More particularly, the present invention adds or improves the following safety feature to such devices: shielding from electromagnetic radiation (EMR); filtering to eliminate EMR conducted along the firing leads of the device; and, increased protection against human borne electrostatic discharge (ESD) when handling the devices. The present invention accomplishes these tasks by incorporating a low-pass filter into the design of current devices.

SUMMARY OF THE INVENTION

The present invention comprises a capacitor, of sufficient area to cover the glass seal of a cartridge actuated ordnance device, having a capacitance value of from about 0.4 microfarads to about 1.1 microfarads. This capacitor connects to the leads of the cartridge actuated ordnance device in a fashion that covers the glass seal of the cartridge. Although the capacitor is not directly contacting the glass seal, it is located proximately so that very few frequencies of EMR can enter the seal, wherein a safe level of EMR is achieved. The capacitor also filters both EMR and ESD that comes through the leads of the cartridge.

This present invention is specifically designed to protect cartridge actuated ordnance from high power EMR resulting from two bodies that are in proximity, or, are intermittently making contact. This environment is commonly known as Hazards of Electromagnetic Radiation to Ordnance (HERO). HERO tests are conducted at a broad range of frequencies using continuous wave and pulsed power modulations. The interaction between the two bodies, such as between a cartridge actuated ordnance device and a person's body loading such a device, causes arcing at various frequencies. The present invention also provides protection against ESD through ionization and filtering.

The present invention was developed in order to provide sufficient EMR protection to meet Military Standard 464 for HERO. Prior to this invention, cartridge actuated ordnance often failed to meet this standard. Although a single capacitor is used in order to accomplish this and other objectives, the configuration and placement of the capacitor would not lead one skilled in the art to deduce that sufficient HERO protection would result.

Accordingly, it is the object of this invention to provide a device that shields a cartridge actuated ordnance from EMR.

It is a further object of this invention to provide a device that filters EMR and ESD from a cartridge actuated ordnance.

This invention accomplishes these objectives and other needs related to protecting cartridge actuated ordnance devices from EMR and ESD.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The invention, as embodied herein, comprises a filtering device that provides electromagnetic radiation and electrostatic discharge protection for cartridge actuated ordnance. The cartridge portion of a cartridge actuated ordnance normally comprises a glass seal that provides a vacuum within the cartridge in order to function properly in actuating ordnance. In most configurations, the cartridge also comprises two leads that extend past the glass seal in order to attach the cartridge to the ordnance for actuation. The present invention comprises a capacitor that has an area sufficient to substantially cover the glass seal. The capacitor also comprises a low pass filter. The capacitor is connected to the cartridge leads so that it substantially covers the glass seal as noted above, but does not actually contact the seal. This configuration provides protection from electromagnetic radiation (EMR) and electrostatic discharge (ESD) through two different methods. First, by covering the glass seal, EMR is physically blocked from entering the cartridge by capacitor. Second, the capacitor filters high frequency EMR and ESD attempting to enter the device through the leads.

Figure 1:
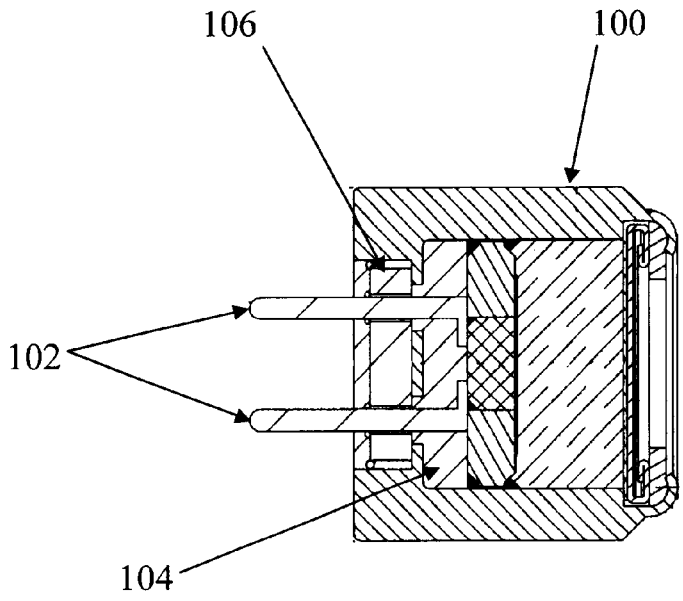
FIG. 1 is a cross-sectional view of a cartridge incorporating an embodiment of the present invention.

Referring to FIG. 1, the cartridge 100 comprises two leads 102 that extend from the sides of a glass seal 104. The glass seal 104 is a standard feature on most cartridges 100 used for actuating ordnance. The glass seal is placed on the cartridge in order to form a vacuum for the initiator portion of the cartridge 100. The present invention comprises a capacitor 106 that has an area sufficient to substantially cover the glass seal 104. This enables the capacitor 106 material itself to substantially block EMR from entering the cartridge 100 through the glass seal 104. In one embodiment of the invention, the capacitor 106 comprises a discoidal capacitor. In another embodiment of the invention, the capacitor 106 comprises a faraday cage to substantially cover the glass seal 104. The capacitor 106 also comprises a low pass filter. More preferably, the capacitor comprises a capacitance of about 0.4 microfarads to about 1.1 microfarads, and comprises a most preferred capacitance of approximately 0.5 microfarads. The capacitor 106 comprises a low pass filter in order to filter out EMR and ESD passing through the leads 102. The capacitor 106 is able to perform both of these functions due to its proximity to the entry point of the EMR and ESD, the leads 102.

Figure 2:
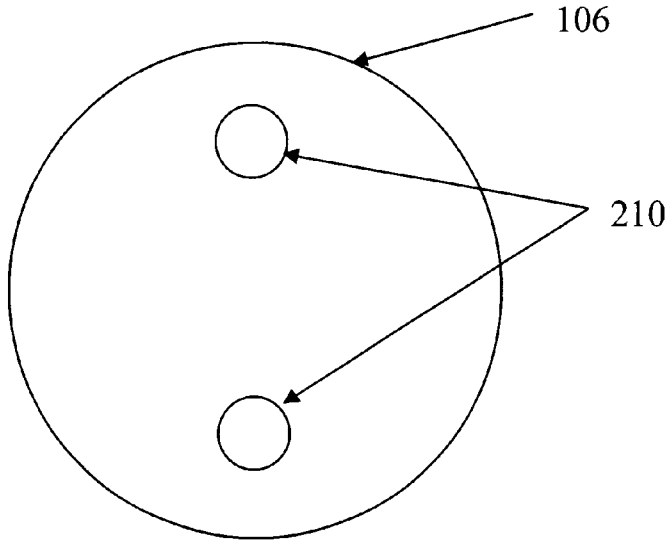
FIG. 2 is a top view of the present invention of the embodiment shown in FIG. 1.

The capacitor 106 is connected to the cartridge 100 by the two leads 102 so that it substantially covers the glass seal 104 as noted above, but does not actually contact the glass seal 104. In the embodiment of the invention shown in FIG. 2, the capacitor 106 comprises holes 210 formed within the capacitor wherein leads 102 fit through the holes. Most standard cartridges 100 comprise two leads 102, so, therefore, the preferred capacitor 106 comprises two holes 210.

The present invention also comprises a method of blocking electromagnetic radiation and filtering electromagnetic radiation and electrostatic discharge from cartridge actuated ordnance. This method comprises providing the filtering device disclosed above.

What is described are specific examples of many possible variations on the same invention and are not intended in a limiting sense. The claimed invention can be practiced using other variations not specifically described above.

What is claimed is:

1. A filtering device that provides electromagnetic radiation and electrostatic discharge protection for cartridge actuated ordnance wherein a cartridge has a glass seal and a plurality of leads, comprising:

a capacitor, having an area sufficient to cover the glass seal, comprising a low pass filter, connected to the leads and substantially covering the glass seal wherein the capacitor substantially blocks electromagnetic radiation from entering the glass seal and provides filtering for both electromagnetic radiation and electrostatic discharge.

2. The filtering device of claim 1, wherein the capacitor comprises a discoidal capacitor.

3. The filtering device of claim 2, wherein the capacitor comprises a capacitance from about 0.4 microfarads to about 1.1 microfarads.

4. The filtering device of claim 3, wherein the capacitor comprises a capacitance of about 0.5 microfarads.

5. The filtering device of claim 4, further comprising a plurality of holes formed within the capacitor wherein the plurality of leads fit through the holes.

6. The filtering device of claim 5, comprising two holes formed within the capacitor.

7. A method of blocking electromagnetic radiation and filtering electromagnetic discharge from cartridge actuated ordnance wherein a cartridge has a glass seal and a plurality of leads, comprising the step of:

providing a filtering device comprising a capacitor, being discoidal and having an area sufficient to cover the glass seal, comprising a capacitance of approximately 0.5 microfarads, connected to the leads and substantially covering the glass seal wherein the capacitor substantially blocks electromagnetic radiation from entering the glass seal and provides filtering for both electromagnetic radiation and electrostatic discharge.

* * * * *